July 16, 1968     E. W. SUNDSTRÖM     3,393,334
DAMPING DEVICE FOR DAMPING VIBRATIONS
OF A ROTARY ELONGATED MEMBER
Filed March 23, 1966     2 Sheets-Sheet 1

INVENTOR.
ERIK WILHELM SUNDSTRÖM
BY
Hane and Nydick
ATTORNEYS

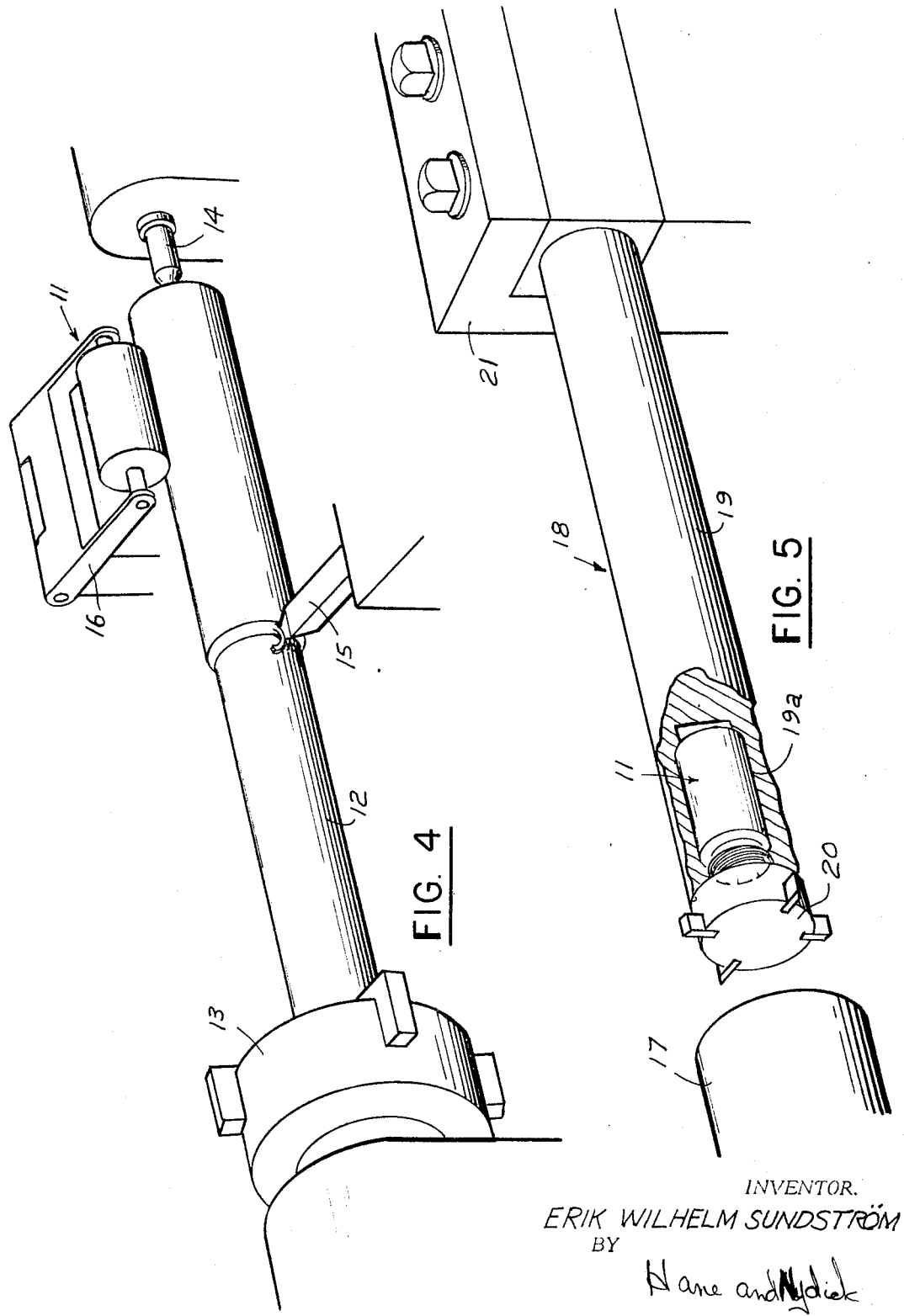

United States Patent Office 3,393,334
Patented July 16, 1968

3,393,334
DAMPING DEVICE FOR DAMPING VIBRATIONS
OF A ROTARY ELONGATED MEMBER
Erik Wilhelm Sundström, Karlskoga, Sweden, assignor to
Aktiebolaget Bofors, Bofors, Sweden, a corporation of
Sweden
Filed Mar. 23, 1966, Ser. No. 536,881
9 Claims. (Cl. 310—93)

ABSTRACT OF THE DISCLOSURE

There is disclosed a vibration damping or suppressing device for damping or suppressing vibrations as may be experienced by an elongate member while being machined or machining a workpiece by mounting the device parallel to the elongate member in coacting relationship therewith. The elongate member may, for instance, be a gun barrel to be turned. The device comprises a magnetic means which is caused to oscillate at amplitudes which are asynchronous with the amplitudes of the vibrations of the elongate member, thereby damping or suppressing such vibrations by counteracting the same.

The present invention relates to a vibration damping or suppressing device for damping or suppressing vibrations as may be experienced by an elongated cylindrical member while being externally or internally machined or by an elongated rotary tool while machining a workpiece.

It is a customary practice to support a workpiece to be machined such as a blank for a gun barrel supported at both ends or at one end only, depending upon whether the workpiece is to be externally or internally machined. The tool may be stationary in which case the workpiece is rotated or the workpiece may be held stationary and the tool rotated.

With the advent of high speed cutting tools as now widely used and the resulting high rotational speed differentials between the workpiece and the tool, vibrations of the workpiece or the tool have become a serious problem. Tools as used for drilling a bore into an elongated cylindrical member such as a blank for a gun barrel are generally in the form of a bar mounting the cutting tool proper at one end. Obviously, the vibrations of the workpiece or the tool are bound to have an adverse effect upon the accuracy of the machining operation.

Various attempts have been made to damp the vibrations of the workpiece itself or of the tool bar used for machining the same. For instance, very hard material such as tungsten carbide steel has been used for the tool bar. However, it has been found that even a tool bar made of such hard material tends to vibrate more than is acceptable. It has also been attempted to incorporate into the tool bar bracing or re-enforcing members but the incorporation of such members has also not been found to be satisfactory.

It is an object of the invention to provide a novel and improved vibration damping device which effectively dampens the vibrations of an elongated rotary workpiece or tool as may occur during the machining of such workpiece.

A more specific object of the invention is to provide a novel and improved vibration damping device which permits a free choice of the material used for the tool if the same is to be rotated during machining and also not the incorporation of bracing members into the tool.

Another more specific object of the invention is to provide a novel and improved vibration damping device which is self-contained and can be used in association with any rotary workpiece or tool of the general kind above referred to.

Other and further objects, features and advantages of the invention will be pointed out hereinafter and set forth in the appended claims constituting part of the application.

In the accompanying drawing several preferred embodiments of the invention are shown by way of illustration and not by way of limitation.

Figure 2:
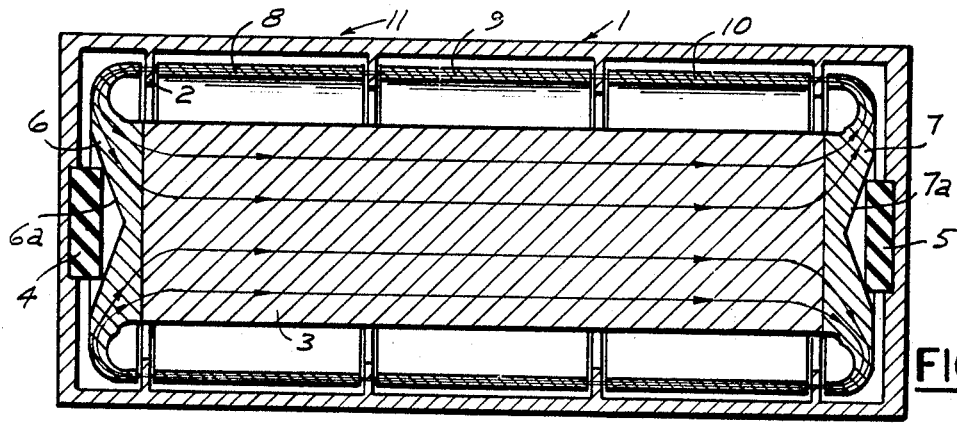
Figure 3:
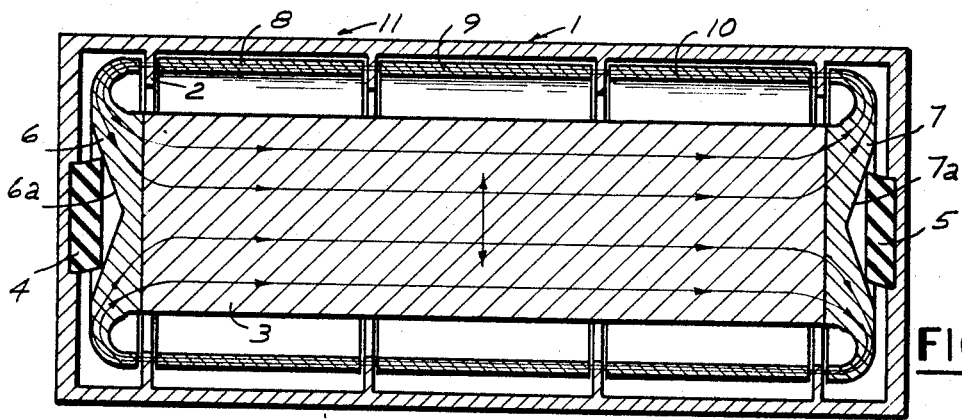
Figure 1:
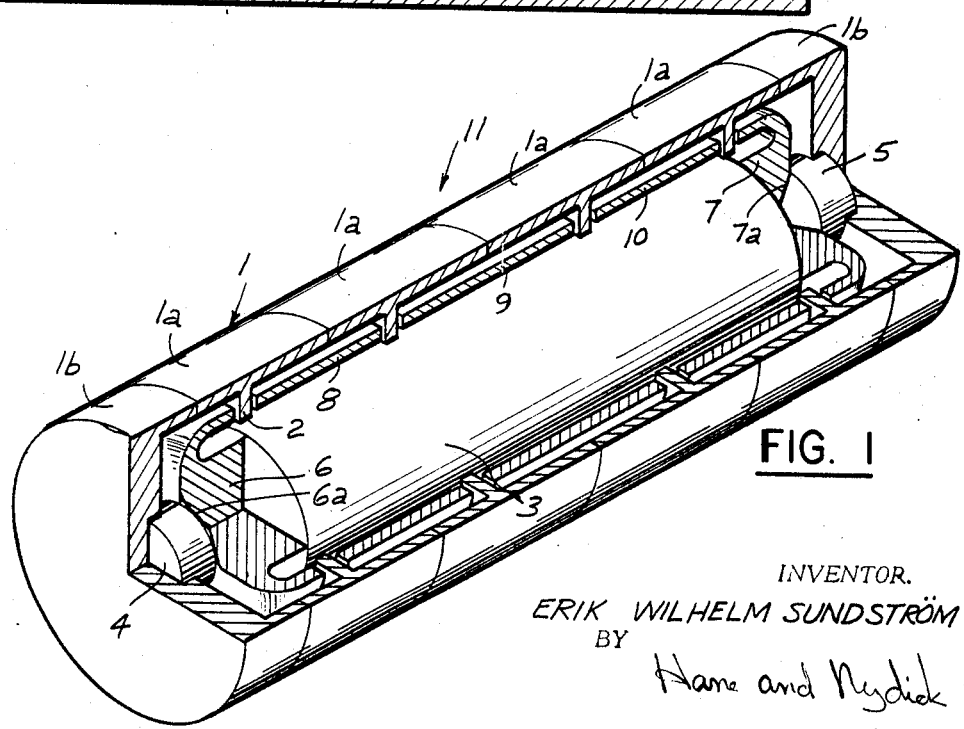

In the drawing:
FIG. 1 is a diagrammatic perspective view, partly in section, of a damping device according to the invention.
FIG. 2 is a longitudinal sectional view of the damping device showing the same in one state of operation.
FIG. 3 is a sectional view similar to FIG. 2 and showing the device in another state of operation.
FIG. 4 is a diagrammatic perspective view showing a damping device according to the invention mounted for damping the vibrations of a rotary cylindrical workpiece, and
FIG. 5 is a diagrammatic perspective view, partly in section, of the vibration damping device mounted for damping the vibrations of a rotary elongated tool.

Referring first to FIGS. 1, 2 and 3 more in detail, the exemplification of a vibration damping device 11 as shown in these figures comprises a cylindrical outer casing 1 made of a suitable non-magnetic material. The casing may be made of one piece, or preferably be composed of several annular ring elements 1a and end pieces 1b as is shown. Each of the elements 1a has secured thereto or integral therewith, an inwardly extending circumferential ring or flange 2 also made of a suitable non-magnetic metal. Both the casing and the rings may be made of copper. A cylindrical permanent bar magnet 3 is disposed within casing 1 coaxially therewith. At each end of the magnet pole pieces 6 and 7 respectively, made of ferromagnetic material, are provided. The bar magnet and the pole pieces constitute a unit which is supported in the casing by elastic mountings 4 and 5 such as rubber buffers which engage conical recesses 6a and 7a respectively, in the pole pieces. The mountings permit vibrations of the unit parallel to its axis. The device further comprises sleeves or ring members 8, 9 and 10 made of ferro-magnetic material and disposed between each two rings 2 as is clearly shown in FIG. 1. The sleeves are suitably secured in a fixed radial position in reference to bar magnet 3 but are free to move radially in reference to rings 2 so that they will participate in vibrations of the bar magnet parallel to its axis. The spaces between the sleeves and the bar magnet may be filled with a suitable magnetically inert material such as a plastic.

The bar magnet, its pole pieces and the sleeves constitute a magnetic means. The magnetic flux lines through said magnetic means being indicated in FIG. 2 by arrows. This figure also shows the entire assembly in a position in which the center line of magnet 3 coincides with the center axis of casing 1. Rubber buffers 4 and 5 bias the assembly into this position.

FIG. 3 shows the assembly in a position in which it is biased out of its centered position, to wit, upwardly in the plane of the drawing. Obviously, the magnet assembly when subject to vibrations transverse to the axis of casing 1 will oscillate upwardly and downwardly in reference to the position of FIG. 2 as it is indicated in FIG. 3 by a double headed arrow.

Turning now to FIG. 4, this figure shows a machine tool set up for machining a cylindrical workpiece 12 such as a blank for a gun barrel. The workpiece is clamped at one end in a suitably power driven chuck 13 and at the other end supported by a counterpin 14. The workpiece is machined by a tool 15 while being rotated. The design of the tool should be visualized as being conventional and does not constitute part of the present invention.

As explained before, a workpiece such as workpiece 12 is likely to vibrate while being machined and to suppress or at least to dampen such vibrations, a damping device 11 as described in connection with FIGS. 1, 2 and 3 is rotatably mounted in abutment with the workpiece. There is shown a mounting structure 16 rotatably supporting the damping device parallel to the axis of the workpiece. The construction of the mounting means as such, is not essential for the invention. Various types of suitable mounting means can be used. It is only essential that the damping device is supported parallel to the axis of the workpiece.

The vibration damping action of device 11 will be more fully described hereinafter.

FIG. 5 shows an arrangement in which the workpiece such as a blank 17 for a gun barrel is held stationary for drilling the bore into the barrel by means of a cutting tool 18. The cutting tool comprises a tool bar 19 to one end of which a suitably cutting head 20 is secured. The tool bar is rotated and axially displaced during a machining operation by a suitable and conventional means diagrammatically indicated at 21.

As previously explained, the tool bar while being rotated is likely to vibrate and to suppress or at least to dampen such vibrations, and axially extending cavity 19a is provided in bar 19. A dampening device 11 as previously described is fitted into the cavity with a fairly close fit between the side walls of the cavity and the outer wall surface of the device.

The operation of the damping device as hereinbefore described is as follows:

It is well known that when the flux lines of magnetic field extend through a copper plate or a plate of other suitable non-magnetic metal and such plate is subjected to movements at an angle with the flux lines, and in particular transversely of the flux lines, eddy currents are generated in the plate. Such eddy currents generate forces in the plane of the copper plate.

Turning now to FIGS. 1, 2 and 3, it is apparent that the flux lines through pole pieces 6 and 7 and sleeves 8, 9 and 10, will traverse copper rings 2 the planes of which are transverse of the axis of bar magnet 3 and of the flux lines of the magnetic field.

As has been previously explained in connection with FIGS. 4 and 5, oscillations or vibrations experienced by workpiece 12 or tool bar 18 will be transmitted to the damping device and cause therein radial vibrations of the magnet 3, pole pieces 6 and 7 and sleeves 8, 9 and 10 in reference to the axis of casing 1 as is clearly apparent from a comparison of FIGS. 2 and 3. The casing itself and with it rings 2 remain stationary in reference to workpiece 12 or tool bar 18. Accordingly, the afore referred to eddy currents are generated in rings 2 and the attendant forces in the planes thereof. As the directions and amplitudes of these forces do not coincide with the amplitudes of the vibrations of workpiece 12 or tool bar 18, they will counteract the vibrations of these components thereby damping the same. It is also evident that such damping action is obtained irrespective whether the damping device engages the outside of the member to be damped as it is shown in FIG. 4, or is incorporated in the member as it is shown in FIG. 5.

While a permanent magnet is shown as the use of such magnet is most convenient, it is evident that the same effect can be obtained by electromagnetic means. Moreover, instead of a rubber buffer a suitable spring cushion can be used.

While the invention has been described in detail with respect to certain now preferred examples and embodiments of the invention, it will be understood by those skilled in the art, after understanding the invention, that various changes and modifications may be made without departing from the spirit and scope of the invention, and it is intended, therefore, to cover all such changes and modifications in the appended claims.

What is claimed is:

1. A vibration damping device for damping vibrations of an elongated rotary member during rotation thereof, said device comprising an assembly including elongated magnetic means, elastic first mounting means supporting said magnetic means at both ends thereof, the elasticity of said mounting means permitting vibrations of the magnetic means parallel to the lengthwise axis thereof, at least one annular member of non-magnetic metal having an inner peripheral outline in excess of that of the magnetic means, second mounting means supporting said annular member in a fixed position encompassing the magnetic means spaced apart therefrom and at an angle in reference to the lengthwise axis thereof, and third mounting means for releasably supporting said assembly parallel to the rotary elongated member in coacting relationship therewith.

2. A vibration damping device for damping vibrations of a rotary elongated member during rotation thereof, said device comprising an elongated casing, an elongated magnetic means disposed in said casing spaced apart therefrom, an elastic mounting means at each end of said magnetic means supporting the same, the elasticity of said mounting means permitting vibrations of the magnetic means parallel to the axis thereof, at least one ring member made of a non-magnetic metal fixedly mounted in the casing encompassing the magnetic means radially spaced apart therefrom and in a plane substantially transverse of the lengthwise axis of the magnetic means, and means supporting said casing parallel to the axis of the rotary elongated member in coacting relationship therewith.

3. A vibration damping device according to claim 2, wherein said casing is made of a non-magnetic metal, said non-magnetic ring member being fixedly united with said casing.

4. A vibration damping device according to claim 2 and comprising a pair of ferro-magnetic pole pieces each interposed between one end of the magnetic means and the respective elastic mounting means, and at least two ferro-magnetic ring members encompassing side walls of said magnetic means and extending between said pole pieces, said non-magnetic ring member being interposed between the ferro-magnetic ring members intermediate the ends of the magnetic means.

5. A rotation damping device according to claim 4, wherein said pole pieces and said ferro-magnetic ring members are displaceable in the casing in unison with the magnetic means when the magnetic means is vibrating parallel to its axis.

6. A vibration damping device according to claim 4, wherein several non-magnetic ring members are provided extending inwardly from said casing in axially spaced relationship, and wherein each of said ferro-magnetic ring members is in the form of a sleeve disposed between two non-magnetic ring members.

7. A vibration damping device according to claim 2, wherein said magnetic means is a permanent bar magnet.

8. An assemblage comprising, in combination, an elongated cylindrical bar to be machined, rotary clamping means secured to said bar at least at one end thereof for rotating said bar about its axis while being machined; a vibration damping device including an elongated casing, an elongated magnetic means disposed in said casing spaced apart therefrom, an elastic mounting means at each end of said magnetic means supporting the same, the elasticity of said mounting means permitting vibrations of the magnetic means parallel to the axis thereof, and at least one ring member made of a non-magnetic metal fixedly mounted in the casing encompassing the magnetic means radially spaced apart therefrom and in a plan substantially transverse of the lengthwise axis of the magnetic means; and mounting means supporting said damping device in abutment with said bar in a position in which the axis of the magnetic means of the device is parallel to the rotational axis of said bar.

9. An assemblage comprising, in combination, a tool including an elongated tool bar, and mounting means supporting said bar rotatable about its axis; and a vibration damping device including an elongated casing, an elongated magnetic means disposed in said casing spaced apart therefrom, an elastic mounting means at each end of said magnetic means supporting the same, the elasticity of said mounting means permitting vibrations of the magnetic means parallel to the axis thereof, and at least one ring member made of a non-magnetic metal fixedly mounted in the casing encompassing the mangetic means radially spaced apart therefrom and in a plane substantially transverse of the lengthwise axis of the magnetic means, said tool bar including a cavity extending lengthwise therein and said casing of the damping device being fitted into said cavity in substantial abutment with the side wall thereof.

References Cited

UNITED STATES PATENTS

| 2,802,122 | 8/1957 | Riordan et al. | 310—93 |
| 2,906,899 | 9/1959 | Geneslay | 310—93 |
| 2,951,955 | 9/1960 | Crowder | 310—93 |

ROBERT K. SCHAEFER, *Primary Examiner.*

H. O. JONES, *Assistant Examiner.*